HEAD LIGHT HAVING ELLIPSOIDAL REFLECTOR

Filed Dec. 28, 1964 4 Sheets-Sheet 1

INVENTOR.
EVAN P. BONE, DECEASED
BY LEAH M. BONE, EXECUTRIX
BY Charles M. Hogan
ATTORNEY.

Oct. 3, 1967 E. P. BONE 3,345,510

HEAD LIGHT HAVING ELLIPSOIDAL REFLECTOR

Filed Dec. 28, 1964 4 Sheets-Sheet 2

INVENTOR.
EVAN P. BONE, DECEASED
BY LEAH M. BONE, EXECUTRIX
BY Charles M. Hogan
ATTORNEY.

INVENTOR.
EVAN P. BONE, DECEASED
BY LEAH M. BONE, EXECUTRIX
BY Charles M. Hogan
ATTORNEY.

INVENTOR.
EVAN P. BONE, DECEASED
BY LEAH M. BONE, EXECUTRIX
BY Charles M. Hogan
ATTORNEY.

United States Patent Office 3,345,510

Patented Oct. 3, 1967

3,345,510
HEAD LIGHT HAVING ELLIPSOIDAL REFLECTOR

Evan P. Bone, deceased, late of Cincinnati, Ohio, by Leah M. Bone, executrix, Ashland, Ky., assignor to J. Page Hayden, Cincinnati, Ohio Filed Dec. 28, 1964, Ser. No. 422,078
10 Claims. (Cl. 240—41.3)

ABSTRACT OF THE DISCLOSURE

This is a head lamp for a vehicle, comprising an illipsoidal reflector, a horizontally oriented light source, and a lens. The reflector has forward and rear focal points and extends forwardly of the latter. The light source is at the rear focal point. The focus of the lens is at the forward focal point of the reflector. The reflector and light source and lens are proportioned to project an elliptical beam pattern having a relatively great horizontal spread. This pattern is symbolically represented by a spoke-like multiplicity of groups of overlapping images of the source.

The present invention relates generally to automobile head lamps and particularly to headlighting systems which are premised on the principle of elliptical projection, i.e., which utilize elliptical or substantially elliptical reflectors.

A basic object of the present invention is to provide acceptable and indeed superior highway illumination and protection against glare, by a novel head lamp structure having lens and reflector elements each of lesser dimensions than the minimum dimensions required by those elements in accordance with prior art headlighting practice. The fulfillment of this objective affords a particularly advantageous cost saving, with emphasis on the reflector. In accordance with prior art headlighting practice, now in wide-spread current usage, automobiles are equipped with head lamp replacement units including a large lens and reflector. Whenever a filament burns out, the motorist is subjected to the substantial expense of buying a large sealed beam replacement unit. In the invention herein disclosed a small sealed beam replacement unit is provided. This small unit is free from another disadvantage and limitation of the prior art units in that, not being large and bulky, it permits great latitude and flexibility to the industrial designer or stylist who is concerned with over-all appearance of the automobile.

Another fundamental object of this invention is to provide a headlighting system which projects a beam pattern satisfying legal requirements imposed by the traffic authorities in the United States, but without complete reliance on the prior art system of spreading by flutes. In general, highway headlighting practice calls for the projection down the road, in front of own car, of a beam pattern having a relatively low spread vertically but a wide spread horizontally, with maximum candle power intensity near the center of the beam pattern and diminishing candle power intensities at points progressively spaced outwardly from said center. The usual prior art practice in head lamp design, generally exploiting the old parabolic projection principle, is to design an accurately focused filament and reflector combination which would normally project a beam pattern in the form of a circular spot. Then the prior art designer provides flutes in the lens, in order to obtain the desired or required horizontal spread of the beam. This system of spreading in accordance with prior art doctrine is wasteful and it lacks economy of design, in that each geometrical element of a flute projects light in only one particular direction. Many flute elements must be provided in order to afford the desired horizontal spread and this disadvantage and limitation of the prior art dictates large sizes for both the reflector and the lens, a requirement which results in a head lamp of large size which not only lacks economy in design but also imposes limitations on the stylist.

Another object of the present invention is to provide, by the use of a relatively long horizontally oriented filament, a head lamp which naturally projects a beam pattern of relatively small vertical spread and wide horizontal spread.

A further object of the invention is also to take advantage of optical characteristics of the lens, for the same purpose, and indeed, the combined optical chasacteristics of both reflector and lens are exploited in combination to that end.

In other words, an object of the invention is to utilize the surface elements of the reflector and the lens to project the rays in many different directions, thus requiring only relatively small sizes of lens and reflector surfaces.

A further object of the invention is to provide a headlighting system of the character described which is compatible with the addition of slight fluting in the event that a designer wishes to alter the pattern provided by the system herein disclosed.

For a better understanding of the present invention, together with other and further objects, advantages and capabilities thereof, reference is made to the following description of the accompanying drawings, all of which, with the exception of FIG. 13, are in diagrammatic or outline form, the drawings being described as follows.

Figures 14, 16:
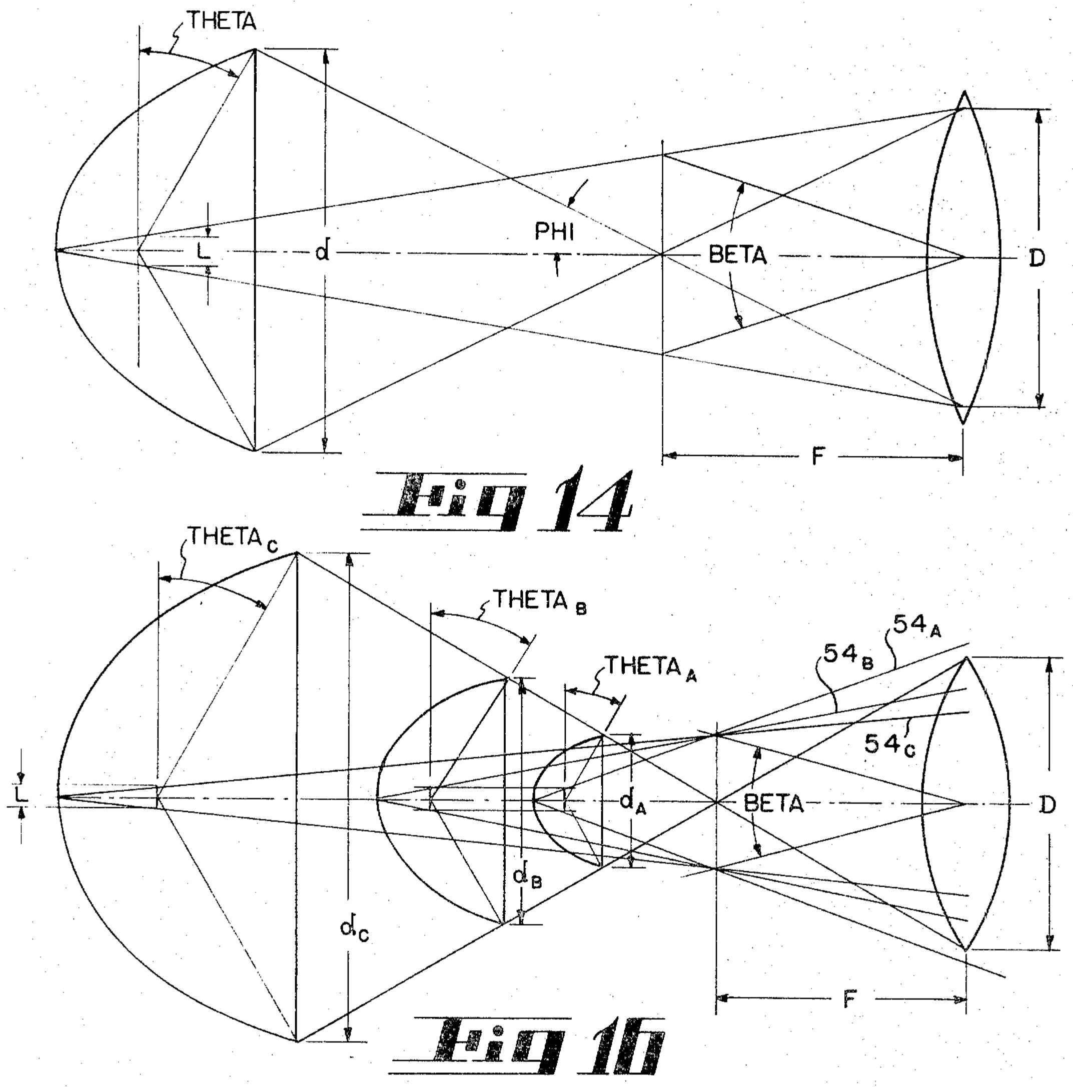
FIG. 14 is another section in horizontal plane showing lens characteristics which require a large reflector.
Figure 15:
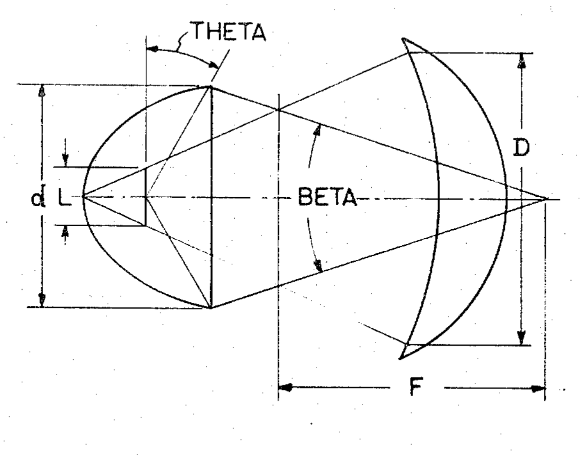

FIG. 15 contrasts to FIG. 14 in showing the lens characteristics for a small reflector; and FIG. 16 is another sectional view in horizontal plane showing the method of designing various sizes of reflectors for a given lens.

Before proceeding to a detailed description of the invention a brief mention of the more pertinent prior art is in order. An elliptical headlight system per se is disclosed in Bone Patent 1,389,291, patented Aug. 30, 1921. The present invention is concerned with improvements to the basic system there shown and to improvements of utility with substantially elliptical reflectors.

Figure 1:
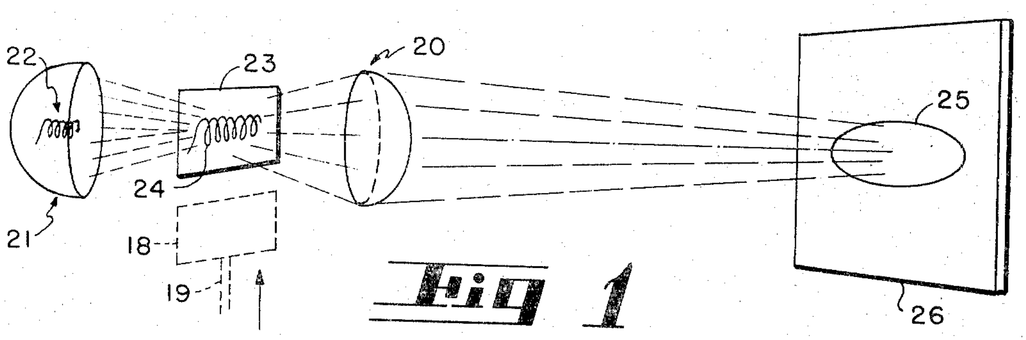
FIG. 1 is a perspective view of the head lamp elements in accordance with the present invention, generally as seen from the side, projecting the beam pattern on a test screen.

The elliptical head lamp projector illustrated in FIG. 1 comprises an image forming lens 20, an elliptical reflector 21, having its forward focus coincidental or substantially coincidental with the principal focus of the lens, and a light source 22 coincidental with the rearward focus of the reflector. In order to render elliptical head lamps legally acceptable for universal use, the invention herein disclosed introduces and features a theoretical line source of light 22, rather than a point source, at the rear focus of the ellipse. This feature and other features herein after described serve to provide a novel headlighting system which naturally projects a beam pattern of the desired horizontally elongated shape. Additionally, these features make practicable a smaller and more compact head lamp structure. An incidental advantage resides in the fact that such structure is less senitive to mechanical inaccuracies than are conventional head lamp structures of the prior art.

The light source 22 is in the form of a long bar filament having its axis disposed horizontally and perpendicular to the central longitudinal axis of the head lamp comprising the elements 20–22. As previously indicated, the elliptical reflector 21 has its rear focus coincidental with filament 22 and its forward focus in the plane 23, whereby an image of filament 22 is formed in plane 23 as indicated at 24. The optical lens 20 has its principal focus in plane 23 and the image 24 now functions as a secondary source of light, in relation to which lens 20 projects another image 25 as shown on a test screen 26. The test screen is set up at a distance in front of the head lamp combination which simulates normal operating conditions. The image 25 is the natural beam pattern and it is of a horizontally elongated shape, due to the elongated shape of the filament 22. Parenthetically, it will be understood that the plane 23 is only an imaginary geometrical surface used herein as an expedient for clarifying the description and explaining the location of the image 25.

Figure 2:
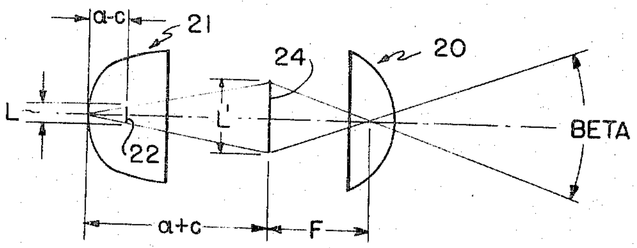
FIG. 2 is a sectional view along a section line through the central plane of the head lamp reflector and lens elements, looking downwardly.

FIG. 2 shows the conditions of FIG. 1 as seen by an observer looking down onto a horizontal plane passed through an axis of the combination of lamp elements. It will be seen that the image 24 is considerably longer than the line 22. The required spread indicated by the angle beta is readily determined by mathematical techniques well known to those of skill in the art, the design variables being the focal length of the lens 20, the length of the filament 22, the eccentricity of the reflector 21, and the major and minor axes of the reflector. The variables being known and the present invention teaching that a horizontally wide filament 22 makes practicable a horizontally spread beam pattern 25, the design of particular head lamp systems featuring the present invention is within the ordinary skill of those versed in the art.

Let the angle beta be defined as the angle of spread of the beam pattern; L is the length of the filament 22; L′ is the length of the image 24; *a* is one-half of the major axis of the reflector ellipse; *c* is the distance from the center of the ellipse to a focus; *e* is the eccentricity of the elliptical reflector; and F is the principal focal length of the lens 20. Neglecting aberrations, $$\tan\frac{\text{beta}}{2}=\frac{L}{2F}\cdot\frac{a+c}{a-c}$$

Therefore $$\tan\frac{\text{beta}}{2}=\frac{L}{2F}\cdot\frac{(1+e)}{(1-e)}$$

The bar filament 22 is not quite so bright near its ends as at the center, due to the cooling effect of the lead wires supporting the filament. However, this effect is advantageous because good road illumination dictates that there should be high candle power intensity in the center region of the beam pattern, with lesser candle power intensity at the sides of the beam pattern. The latter condition is desirable for roadside illumination and for rounding curves, and the former condition is desirable for long ranges of straightaway driving.

Figure 3:
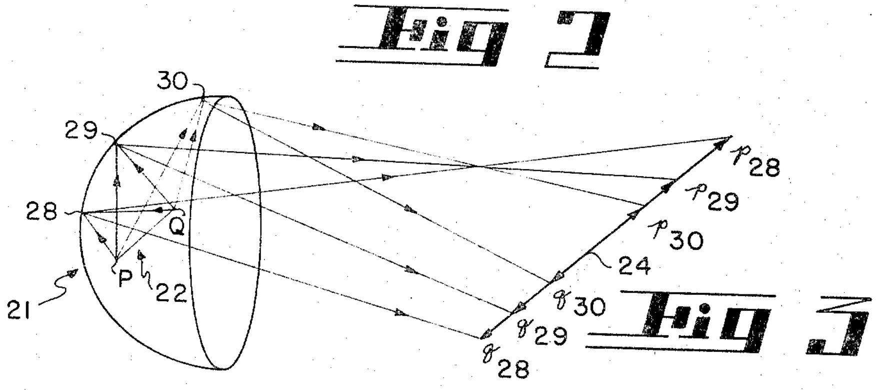
FIG. 3 is an isometric view of the reflector, used as an aid in describing its optical characteristics.

In accordance with the present invention optical characteristics of the reflector and lens are utilized to obtain a desired gradient in candle power from the center of the beam pattern outwardly, both horizontally and vertically, but particularly horizontally. FIG. 3 illustrates the effect of the reflector characteristics. The long bar filament light source 22 is here abstractly represented by the horizontal line between points P and Q located at the rear focus of reflector 21. The optical characteristics of the reflector are such that the image in the plane 23 is not a single enlarged line corresponding in intensity to the line P Q but in fact is a composite of many image lines of various lengths, these lengths being determined by the subtended angles of the light rays projected from the various points such as 28, 29 and 30 on the surface and in the vertical median plane of the reflector 21. The light rays from point 28, near the reflector vertex, form the image line $p_{28}$, $q_{28}$ of greatest length. The ligth rays from reflector point 29 form an image of shorter length and the rays from reflector point 30 form the image line $p_{30}$ $q_{30}$ of least length. All of the image lines are superimposed at the center of the image 24 and the number of superimposed lines progressively decreases with displacement toward the end point of the image, so that the candle power intensity gradually decreases outwardly. The eccentricity of the ellipse is utilized to obtain whatever desired decrease in candle power intensity is desired. Parenthetically it is here pointed out that the beam pattern is also decreased in intensity vertically outwardly from the center so that a lower candle power is directed down the road for close distances, that is, closer to own car than the distance to which the maximum candle power is directed. This is done in order to secure a more uniform illumination of the road surface and objects thereon.

Figure 4:
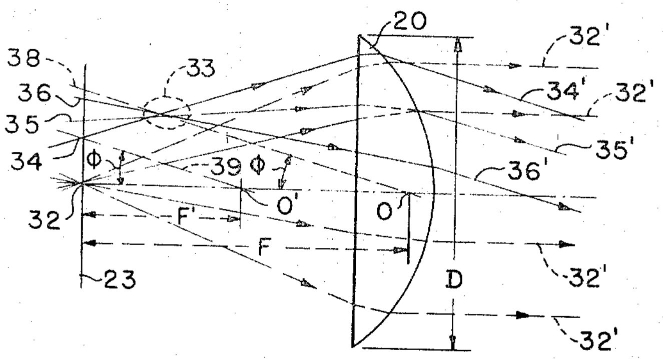
FIG. 4 is an elevational sectional view of the lens, the plane of the section being vertical and the point of view being that of observer on one side of said plane.

Reference is now made to FIG. 4 for an illustration of another feature provided by the present invention. In accordance with the invention the lens 20 is proportioned so that the focal length for wide side angle rays is effectively shortened, as compared to the focal length for axial rays. This proportioning further increases the horizontal beam spread. That is, the curvature of lens 20 is designed to correct spherical aberrations, particularly coma, for rays parallel to the longitudinal axis, but the optical characteristics are made to be such that for rays projected at wide side angles the focal length of the lens is effectively shortened. Therefore, light projected at the wide side angles is spread out and is of lesser intensity. The relatively longer focal length for axial rays causes greater concentration and beam intensity and forms a "hot spot" at the center as desired. In FIG. 4 typical axially projected rays are indicated at 32'. Since aberrations are corrected for the axial rays, all rays passing through the principal focus 32 are parallel with the longitudinal axis when emerging from the lens 20; said rays being highly concentrated, produce the high candle power intensity for the central region of the beam pattern. (These rays 32' are shown in dotted lines.) Rays projected at side angles such as 34', 35' and 36' are shown as emerging from the lens parallel with each other but at an acute angle phi relative to the longitudnial axis. If the lens 20 were aplanatic all rays emerging from the lens at this angle would cross the focal plane 23 at a point 38, this point being the intersection in the focal plane of a line 0–38, the line 0–38 passing through optical center 0 of the lens at that angle with respect to the axis. However, the rays 34', 35' and 36' are illustrated as crossing the focal plane at points 34, 35, 36 nearer to the central axis than point 38. Ray 34' crosses the focal plane at 34, nearest of all to the central axis. Line 39, passing through point 34 at the angle phi in relation to the central axis intersects the central axis at point 0', which is the effective optical center of the lens for the ray 34', and F' is the effective focal length for ray 34' as indicated.

The point is that the lens 20 has a long focal length F for rays projected parallel with the axis and shorter focal lengths such as F' for wide angle side rays.

Moreover, rays projected at the side angles, in such a manner as to cause the greater spread of the beam pattern and outwardly decreasing candle power intensity, do not come from a definite focus but appear to come from an apparent focus or area of least confusion, such for example as that illustrated at 33.

The degree of difference between the long focal length F for rays projected parallel with the axis (FIG. 4) and the short focal length F' for wide side angle rays and the intervening gradient ar determined by the ratio of the lens diameter D to the principal focal length F and to the extent to which the lens departs from the sine condition, an expression well known to those skilled in the art (see Fundamentals of Optics, Jenkins and Whtie, McGraw-Hill, New York, 1957, third edition, page 156). Control of the extent of lens departure from the sine condition can be accomplished by methods well known to those skilled in the art and to an extent required by particular designs.

Figure 5:
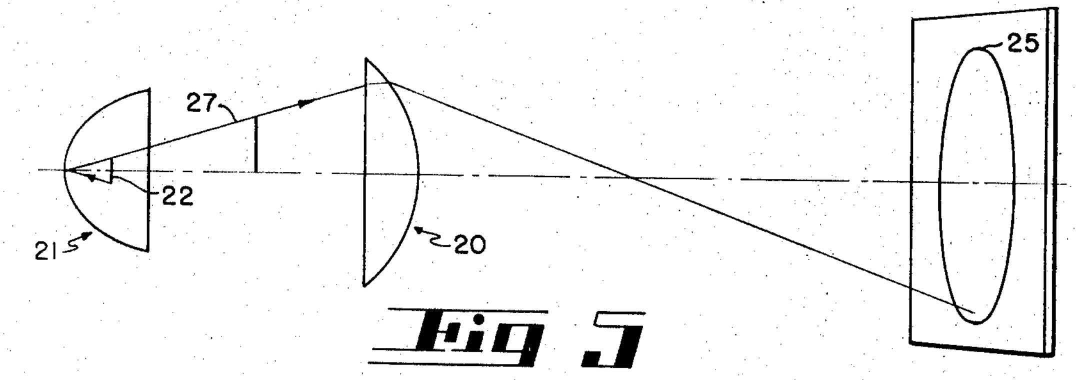
FIG. 5 is a top plan view of the combination of elements in accordance with the invention and is used as an aid in explaining the composite effects of the optical system characteristics discussed in connection with FIGS. 3 and 4.

The combined effects of the reflector of FIG. 3 and the lens of FIG. 4, rather their principles, are illustrated in FIG. 5. The ray 27 is projected with maximum spread to the extreme edge of the beam pattern illustrated at 25. This ray is traced back to the edge of the filament 22 and to a point near the vortex of the reflector from which region the reflector, by reason of the optical characteristics described in connection with FIG. 3, contributes the greatest spread $p_{28}$ $q_{28}$. Further, the ray 27 traverses the lens near its outer edge, where the lens, by reason of its optical characteristics, is noted in the discussion of FIG. 4, contributes the greatest spread to angular rays.

Thus while the naturally horizontally elongated beam pattern provided by this invention is in part the direct result of the long horizontal bar filament 22, the combined effects of the optical characteristics of the reflector and lens produce a still further naturally elongated beam pattern, with candle power intensities decreasing outwardly from a maximum intensity near the center.

Figure 6:
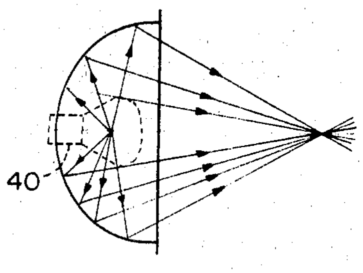
FIG. 6 is a sectional view, looking toward the horizontal mid plane, of a reflector, showing it in combination with a conventional bulb.
Figure 7:
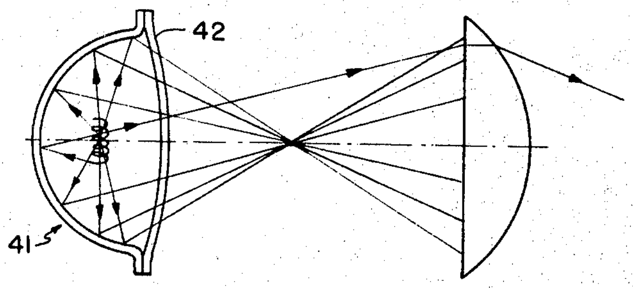
FIGS. 7 and 8 are sectional views of improved filament and reflector combinations in accordance with the invention, but otherwise taken from the same points of observation as FIG. 6.
Figure 8:
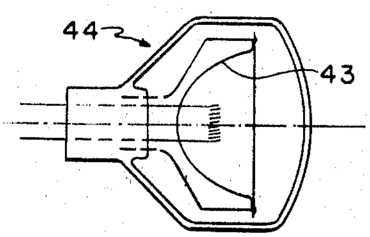

Reference is now made to FIGS. 6, 7 and 8 in the discussion of a further advantageous feature of the invention. Heretofore it has been the practice to enclose within the reflector a light bulb such as that shown at 40 (FIG. 6). While the bulb is transparent, so that light from the reflector can pass through it, such light is so distorted and deflected in actual practice that its utility for head lamp purposes is negligible. Many rays from the reflector strike the bulb 40 at such glancing angles that they are reflected, some with total reflection, and the light which does pass through the glass is subjected to undesired refractions. In the discussion of FIG. 3 it was shown that the light at the extreme sides of the beam pattern is reflected by points on the reflector at or near its vertex. This light would be blocked off by the conventional bulb such as 40 (FIG. 6). Therefore the desired wide horizontal beam spread could not be secured, with the use of a bulb such as 40, unless the reflector were made so large in proportion to the bulb that the size of the bulb could be neglected. Therefore, in accordance with the invention, this bulb is eliminated and the filament is placed within a casing so shaped that the surface of the casing is substantially perpendicular to the rays reflected from the reflector, particularly those reflected from points near the vertex of the reflector. FIGS. 7 and 8 show two forms of casing in accordance with the invention. FIG. 7 shows a glass sealed beam unit 41 comprising a reflector and filament and a glass closure element 42. Note that rays from the vertex of the reflector traverse the transparent closure member 42 substantially at right angles. In the FIG. 8 embodiment the metal reflector 43 is placed entirely within a glass bulb 44, the frontal portion of which is approximately perpendicular to rays reflected from points near the vertex of the reflector.

Attention is invited to the economy of glass utilization of optics in accordance with the present invention. A relatively small lens is made practical, partially by reason of the fact that the same points on the glass are utilized for projecting light to many different points in the beam pattern. The spread, rather a substantial part of the spread, is caused by reason of the long bar filament 22. In the ordinary head lamp flutes are used to secure the horizontal spread or at least most of such spread. When flutes are used each geometrical element of the flute projects light in a different direction. In a symmetrical flute, for example, the central element projects the light straight ahead and the elements at the extreme sides project light to the sides. Systems with fluted elements lack economy of light utilization, requiring a large total surface of glass in the lens and therefore a large lens.

Again making reference to FIG. 4, it will be observed that from the point 32 of the greatest light intensity, rays are projected to essentially the entire surface of the lens 20. These rays 32' emerge from the lens parallel with the axis of the head lamp elements to form the central region of the beam pattern of maximum candle power. Relatively fewer rays emerge from such points as 34, 35, and 36, but they pass through the lens surfaces at the same zones as some of the rays 32'. This use of the same glass for rays projected in many different directions effects economy of glass utilization and makes possible a small lens. The total size neded for the lens is determined only by the area needed for the rays 32', projected to that portion of the beam pattern of maximum power intensity. From this fact and by well known optical principles, the needed area of lens can be specified by the formula $$A=\frac{I}{kb}$$

where I is the desired maximum intensity of the beam candle power; $k$ the combined factor of reflection and transmission of the surfaces and substances encountered by the rays; $b$ the average brightness of the envelope of the helical filament near its center and A the required area of lens opening. Or, expressed in lens diameter $D_1$, $$D=\sqrt{\frac{4I}{\pi kb}}$$

Figure 9:
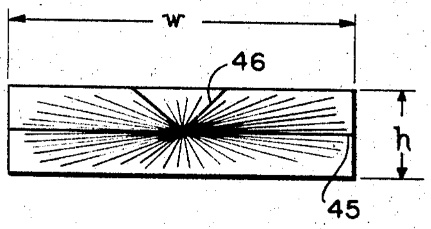
FIG. 9 is an illustration of images formed by the reflector from a line light source, in accordance with the invention.
Figure 10:
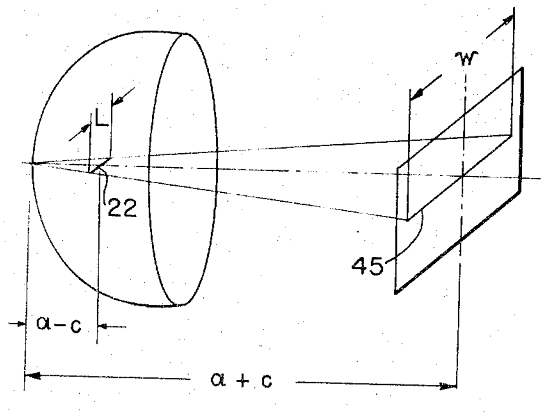
FIGS. 10 and 11 are isometric views showing geometric relations employed in determining the maximum width and height, respectively, of the beam pattern.

Having computed the diameter of the lens, a desirable next step is to determine the eccentricity of the ellipitical reflector in conjunction with the diameter and focal length of the lens. In order to establish the most desirable eccentricity for the reflector, the ratio $w/h$ i.e., width to height of filament image should be determined. That is, the filament 24, formed in the focal plane 23 (FIG. 1) and not the final image as modified by the lens in forming the beam pattern. FIG. 9 illustrates the form of the image in plane 23. Considering the source 22 as a line, this image is made up of a composite of lines, each image line being projected from a typical reflector point, said points being distributed uniformly over the reflector surface. The image line 45 forms the width $w$, of the composite image, this longest image line 45 being projected from the vertex of the reflector 21, as illustrated in FIG. 10. The width $w$, then, is expressed by the equation $$w=L\cdot\frac{a+c}{a-c}\text{ or }w=L\cdot\left(\frac{1+e}{1-e}\right)$$

where L is the length of source 22 and $a$ and $c$ and $e$ are as defined above.

Figure 11:
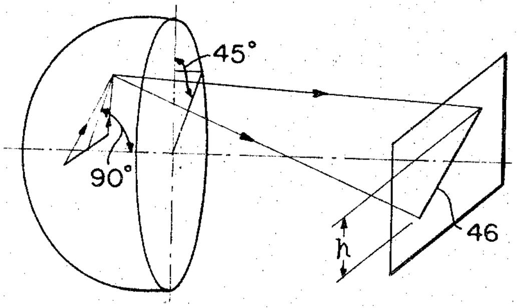

The image line 46 (FIG. 9) forms the dimension of the composite image of maximum height $h$. This image line 46 is formed from a point in the reflector surface in a plane perpendicular to the reflector axis at the rear focus and in the median plane 45° from the horizontal, as illustrated in FIG. 11. The maximum height $h$ is expressed by the equation $$h=L\cdot\frac{a^2+c^2}{a^2-c^2}\sin^2 45^\circ\text{ or }h=\frac{L}{2}\cdot\frac{a^2+c^2}{a^2-c^2}$$

The ratio of width to height is then, $$\frac{w}{h}=\frac{2(a+c)^2}{a^2+c^2}\text{ or }\frac{w}{h}=\frac{2(1+e)^2}{1+e^2}$$

Thus the ratio $w/h$ increases as the eccentricity of the ellipse increases, approaching the value of 4, as the eccentricity approaches unity, the maximum for an ellipse.

Figure 13:
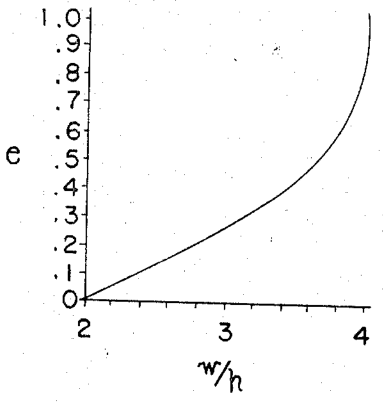
FIG. 13 is a Cartesian coordinate graph showing the functional relationship between reflector eccentricities and the reflected image width-height ratio.

The graph in FIG. 13 shows the value of the ratio $w/h$ for values of eccentricity $e$ from zero up to 1. While it is desirable to have the ratio of $w/h$ as high as possible, there are other factors such as the ratio $D/F$, or lens diameter to lens focal length, to be considered. But it is noted that an eccentricity of only 0.75, for instance, gives a ratio $w/h$ of 3.92 as indicated by the graph. This satisfactorily approaches the value of 4.0 for ratio $w/h$.

Figure 12:
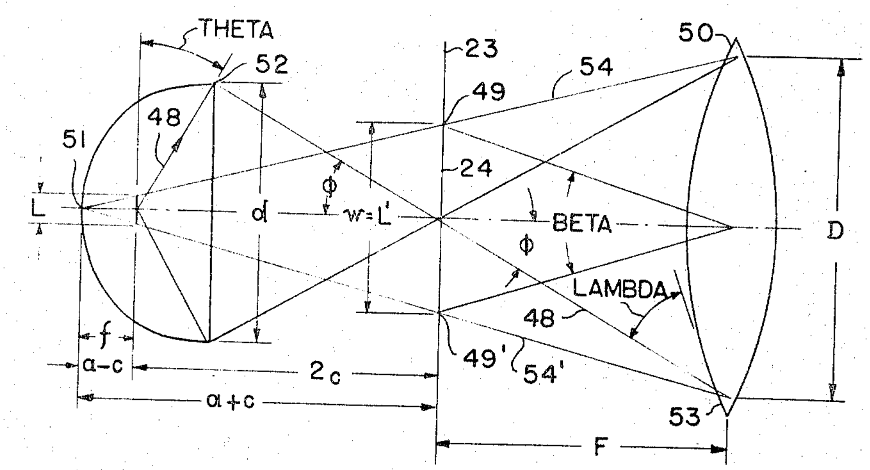
FIG. 12 is a sectional view looking at the horizontal mid plane and used in discussing the design of lens and reflector.

In accordance with the teachings of the present invention head lamps to meet specific requirements are designed by following the procedure now outlined. FIG. 12 shows a head lamp in accordance with the invention, with letters indicative of certain of its parameters. In designing a head lamp in accordance with the invention, the data first considered are the maximum beam candle power and the vertical spread of the beam pattern, referred to as alpha. The natural horizontal spread beta may be assumed to be approximately four times the vertical spread (or four times alpha) following the ratio of filament image width to height of four. This natural horizontal beam spread beta and the candle power gradient from center to edges of the pattern are modified by the optical characteristics of the reflector and lens as explained above.

The lens diameter D, for producing the maximum beam candle power intensity is determined by the formula given above. The ratio $D/F$, i.e. lens diameter to lens principal focal length, is now tentatively established by a consideration of lens characteristics as explained in connection with FIG. 4. In general, when the ratio $D/F$ is as large as possible, the best results are accomplished. The principal factor to limit this ratio rests on the angle lambda (FIG. 12) at which the light ray 48, from lens focus to periphery of lens, strikes the glass surface. If the ray impinges the glass at too glancing an angle, in order to make lambda small, much light is reflected at the surface and is lost. This factor tends to offset the other advantages of short focus of lens with respect to its diameter and, in general, establishes the optimum value of $D/F$. Moreover, the mechanical sensitivity of the optical system varies inversely with F, but with the usual dimensions for F, best suited for practice, the sensitivity comes well within the usual tolerances of lamp manufacture.

Having established the lens diameter D and the ratio for $D/F$, the dimensions for the focal length F of the lens can be determined and this locates the position of the focal plane 23 with respect to the lens, as shown in FIG. 12.

Assuming the horizontal spread beta to be approximately four times the given vertical spread alpha, and drawing lines from the optical center $o$, of the lens, each making the angle beta/2 with the axis, to intersect the focal plane 23 at 49 and 49', the horizontal limits of image L' are established as indicated.

In the description of FIG. 5, the advantage was explained of having the ray from the apex of the reflector pass the edge of the filament image 24, to strike the lens near its edge. Then by drawing a straight line from the edge 50 of the lens, back through the edge 49 of image 24, until it intersects the vertex at 51, a desirable location for the apex of the reflector is established, and this gives the dimension $(a+c)$ of the ellipse.

In order to maintain an advantageous vertical depth of beam pattern the elliptical reflector should extend forwardly in order to subtend approximately 70 to 80% of the light from the filament 22. This means that the angle theta (FIG. 12) should be 30 degrees or more. The ray 48 from the rear focal point of the reflector to the peripheral edge 52 of the reflector which is reflected through the forward focal point of the reflector must come within the lens aperture as it is reflected through the lens, i.e., within the outer edge 53.

The desirable eccentricity $e$ of the elliptical reflector is then established. The angle phi is fixed by the lens ratio $D/F$ (tan phi$=D/2F$) as shown. The eccentricity of the ellipse is then $$e=\left(\frac{1}{\tan\phi}+\tan\text{ theta}\right)\left(\frac{1}{\frac{1}{\sin\phi}+\frac{1}{\cos\text{ theta}}}\right)$$

Knowing the eccentricity, $c$ can be computed from the expression $$c=\frac{e}{1+e}(a+c)$$

and the reflector focal length is $f=(a+c)-2c$. From this layout, the minimum diameter $d$ of the reflector opening is determined as shown in FIG. 12.

The length L of the light source is established by the intersections of the lines 54 and 54' with the rear focal plane of the ellipse as shown. Or, the approximate length L of the filament can be computed as follows:

$$L=\frac{4hf}{a+c}$$

As illustrated in FIG. 14, there is a further advantage in using a short focal length of lens with respect to its diameter (i.e. a high ratio $D/F$) other than those hereinbefore pointed out. The layout in this FIG. 14 is made with the same assumptions as those for FIG. 13 except that the lens focal length F is slightly greater giving a lower ratio of $D/F$. Following the same geometry as for FIG. 13, it will be noted that this larger focal length of lens requires a much larger reflector (see FIG. 14) and a large reflector is contrary to the objectives of this invention of small optical parts.

On the other hand, a smaller reflector can be designed by using a lens as shown in FIG. 15. Such meniscus lens, however, approaches more closely to the sine condition for lens aplanatism and therefore may not have the particular advantages of lens aberrations as pointed out in connection with FIG. 4, but this advantage may be sacrificed somewhat in obtaining the further advantage of small reflector. It will be noted further, in connection with the relatively very small reflector in the layout of FIG. 15, that its eccentricity is low and the length L of the light source required is large.

If the reflector, for any layout, turns out too small in practice, with resultant overheating, bulb blackening or other objections, then the reflector can be made larger, without changing the lens ratio *D/F*, the reflector eccentricity *e*, or the filament length L, as shown in FIG. 16. The three sizes of reflectors shown are adapted to the same lens and same filament, the reason for which is due to the fact that the pertinent triangles are similar throughout, and the reflector eccentricity remains constant. An optical objection to the larger reflectors is that the ray 54 strikes the lens nearer its center for the larger reflectors. The advantage of having this extreme ray, such as 27 or 54, strike the lens near its edge, was explained in connection with FIGS. 4 and 5. However, if the reflector is made too small, such as the one with diameter $d_A$ (FIG. 16), its extreme ray 54A misses the lens. So, aside from the economy of a small reflector, there is an optical advantage in not having the reflector too large or too small.

An interesting consideration is the fact that, for the important rays forming the beam center of maximum candle power, the smaller elliptical reflectors are no more sensitixe to mechanical inaccuracies in filament displacement than the larger ones and are even less sensitive to reflector surface distortion than the large reflectors. This feature is from purely geometric reasons and is contrary to the characteristics of the parabolic lamp where a smaller reflector needs more accuracy to get equivalent results.

Thus it will be seen that in accordance with the invention there are provided improvements in elliptical reflector optics for head lamps which fulfill the objects of the invention.

In the improved elliptical type of system, a screen 18 of appropriate characteristics can be placed in or near plane 23 (FIG. 1) by arm 19 to control glare. Elements 18 and 19 are shown in dashed outline in FIG. 1 because they are optional. Please see screen 6 of U.S. Patent 1,389,291, issued to Bone on Aug. 30, 1921. Please see also screen 5 of U.S. Patent 1,480,803 issued to Bone on Jan. 15, 1924.

While there has been shown a preferred embodiment of the invention, incorporating its teachings, it will be understood by those skilled in the art that various changes and modifications may be made therein without departing from the true scope of the invention as defined in the appended claims.

What is claimed is:

1. A vehicle head lamp for projecting a natural elliptical beam pattern having a horizontal spread which is substantially greater than its vertical spread and comprising, in combination:

a substantially ellipsoidal reflector having forward and rear focal points and extending forwardly of the rear focal point, a horizontally oriented light source in the form of a filament long relative to its width, said source being disposed perpendicular to the axis of the reflector and in the region of said rear focal point, and a lens having a focus in the region of said forward focal point, said reflector having such eccentricity and the light source being so positioned in relation to the reflector that the combination produces in the region of said forward focal point an image pattern having the proportions $$\frac{w}{h}=\frac{2(1+e)^2}{1+e^2}$$

and symbolically represented by a multiplicity of groups of overlapping images of the source, the groups being angularly displaced and related in spoke-like fashion and having overall lengths functionally related to their angular displacement from a plane passing through the focal points, where *w* is the width of the image pattern, *h* is the height of the image pattern, and *e* is the eccentricity of the reflector.

2. A vehicle head lamp in accordance with claim 1 in which:

the light source and the reflector are so proportioned as to project an image pattern of the light source having a distribution in which the intensity of the light decreases from the center outwardly.

3. A vehicle head lamp in accordance with claim 2 in which:

the eccentricity of the reflector is greater than 0.75.

4. A vehicle head lamp in accordance with claim 3 in which:

the reflector extends forwardly sufficiently far to subtend approximately 70% of the light from the light source.

5. A vehicle head lamp in accordance with claim 4 in which:

the included angle between the vertical and an imaginary line from the center of the light source to a forward edge of the reflector is at least 30°.

6. A vehicle head lamp for projecting a natural elliptical beam pattern of fixed directivity and having a horizontal spread which is substantially greater than its vertical spread and comprising, in combination:

a substantially ellipsoidal reflector having forward and rear focal points and extending forwardly of the rear focal point, a horizontally oriented light source in the form of a filament long relative to its width, said source being disposed perpendicular to the axis of the reflector and in the region of said rear focal point, a lens having a focus in the region of said forward focal point, said reflector having such eccentricity and the light source being so positioned in relation to the reflector that the combination produces in the region of said forward focal point an image pattern having the proportions $$\frac{w}{h}=\frac{2(1+e)^2}{1+e^2}$$

and symbolically represented by a multiplicity of groups of overlapping images of the source, the groups being angularly displaced and related in spoke-like fashion and having over-all lengths functionally related to their angular displacement from a plane passing through the focal points, where *w* is the width of the image pattern, *h* is the height of the image pattern, and *e* is the eccentricity of the reflector, and an anti-glare light-intercepting means located in the region of the forward focal point for introducing a shadow into said beam pattern.

7. A vehicle head lamp in accordance with claim 6 in which:

the light source and the reflector are so proportioned as to project an image pattern of the light source having a distribution in which the intensity of the light decreases from the center outwardly.

8. A vehicle head lamp in accordance with claim 7 in which:

the eccentricity of the reflector is greater than 0.75.

9. A vehicle head lamp in accordance with claim 8 in which:
 the reflector extends forwardly sufficiently far to subtend approximately 70% of the light from the light source.

10. A vehicle head lamp in accordance with claim 9 in which:
 the included angle between the vertical and an imaginary line from the center of the light source to a forward edge of the reflector is at least 30°.

References Cited

UNITED STATES PATENTS

| | | | |
|---|---|---|---|
| 2,283,598 | 5/1942 | Decalion ---------- | 240—41.3 |
| 2,576,875 | 11/1951 | Bergmans et al. ----- | 240—41.3 |

FOREIGN PATENTS

| | | |
|---|---|---|
| 1,010,024 | 6/1957 | Germany. |

NORTON ANSHER, *Primary Examiner.*

C. C. LOGAN, W. FRYE, *Assistant Examiners.*